(12) United States Patent
Yoon et al.

(10) Patent No.: US 8,999,018 B2
(45) Date of Patent: Apr. 7, 2015

(54) APPARATUS AND METHOD FOR RAPIDLY PRODUCING SYNTHETIC GAS FROM BIO-DIESEL BY-PRODUCT USING MICROWAVE PLASMA

(71) Applicant: Korea Institute of Energy Research, Daejeon (KR)

(72) Inventors: Sang Jun Yoon, Sejong (KR); Jae Goo Lee, Daejeon (KR); Yong Ku Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/973,340

(22) Filed: Aug. 22, 2013

(65) Prior Publication Data

US 2014/0054504 A1    Feb. 27, 2014

(30) Foreign Application Priority Data

Aug. 22, 2012    (KR) .......................... 10-2012-0091876

(51) Int. Cl.
*C10J 3/00*    (2006.01)
*C10J 3/50*    (2006.01)
*B01J 19/08*   (2006.01)

(52) U.S. Cl.
CPC ........ *B01J 19/088* (2013.01); *B01J 2219/0883* (2013.01)

(58) Field of Classification Search
CPC ........ C10J 3/50; C10J 3/84; C10J 2300/0903; C10J 2300/1238
USPC ............................................... 48/61; 204/172
See application file for complete search history.

(56) References Cited

U.S. PATENT DOCUMENTS

| | | | | |
|---|---|---|---|---|
| 3,871,839 | A | * | 3/1975 | Moody ........................ 48/197 R |
| 5,015,349 | A | * | 5/1991 | Suib et al. ....................... 204/168 |
| 5,131,993 | A | * | 7/1992 | Suib et al. ....................... 204/168 |
| 2007/0017913 | A1 | * | 1/2007 | Martinez ....................... 219/687 |
| 2008/0296294 | A1 | * | 12/2008 | Uhm .............................. 219/688 |
| 2010/0230270 | A1 | * | 9/2010 | Lee et al. ....................... 204/155 |
| 2012/0018294 | A1 | * | 1/2012 | Jensen et al. ................... 204/164 |
| 2013/0213795 | A1 | * | 8/2013 | Strohm et al. ............ 204/157.15 |

\* cited by examiner

*Primary Examiner* — Matthew Merkling
(74) *Attorney, Agent, or Firm* — Rothwell, Figg, Ernst & Manbeck, P.C.

(57) ABSTRACT

Provided are an apparatus and a method for rapidly producing a synthetic gas from a bio-diesel byproduct using microwave plasma, in which, while a plasma flame is generated by a plasma generator and waste glycerin, a bio-diesel byproduct, as fuel, is gasified by being supplied to the generated plasma flame of high temperature, the fuel is supplied in various types to increase the contact time or the contact area with the plasma flame and thus promote gasification thereof and the contents of steam and oxygen supplied and the plasma power are controlled to increase the collection amount of combustible gas and thus allow rapid production of the synthetic gas.

6 Claims, 9 Drawing Sheets

APPARATUS AND METHOD FOR RAPIDLY PRODUCING SYNTHETIC GAS FROM BIO-DIESEL BY-PRODUCT USING MICROWAVE PLASMA

CROSS REFERENCE TO RELATED APPLICATION

The present application claims priority to and the benefit of Korean patent application No. 10-2012-0091876 filed on Aug. 22, 2012, the entire content of which is incorporated herein by reference for all purposes.

BACKGROUND OF THE INVENTION

1. Field of the Invention

The present invention relates to an apparatus and a method for rapidly producing a synthetic gas from a bio-diesel byproduct using microwave plasma, and more particularly, to an apparatus and a method for rapidly producing a synthetic gas, in which, while a plasma flame is generated by a plasma generator and waste glycerin, a bio-diesel byproduct, as fuel, is gasified by being supplied to the generated plasma flame of high temperature, the fuel is supplied in various types to increase the contact time or the contact area with the plasma flame and thus promote gasification thereof and the contents of steam and oxygen supplied and the plasma power are controlled to increase the collection amount of combustible gas and thus allow rapid production of the synthetic gas.

2. Description of the Prior Art

Plasma refers to an ionized state of gas in which atomic nuclei and electrons are separated from each other, which is called the fourth state of matter. The formation of plasma results in generating a large amount of radicals capable of activating a chemical reaction. Plasma may be largely classified into low-temperature plasma and high-temperature plasma.

The low-temperature plasma may be used in a field requiring a chemical reaction at a low temperature of 100° C. or lower. The high-temperature plasma may be applied in fields of incineration, dissolution, and the like, requiring a high temperature since it can raise the material temperature to even 5000° C. or higher for a short time. Recently, the high-temperature plasma technology is studied and applied in fields from simple incineration and combustion to the gasification technology in which the process efficiency is improved and the generated gas is variously utilized. As the plasma method that has been widely used until now, there is a method of using a torch through arc discharge. However, according this method, the electrode lifespan is limited due to a high temperature during discharging, a high power is required since a large amount of current needs to flow, and the electrode lifespan is shortened when steam necessary for a gasification reaction is introduced. Therefore, in recent years, studies on high-temperature plasma application technology utilizing microwaves haven been actively conducted. Particularly, studies on gasification using microwave plasma have gained attention in the arc torch plasma gasification technology that has been much applied to the conventional waste treatment.

Meanwhile, gasification refers to a process that converts hydrocarbon-based materials into a mixed type of combustible gases such as hydrogen, carbon monoxide, and methane, through partial oxidation. With respect to the existing gasification, the apparatus needs to be initially pre-heated to a temperature for operation, about 1300° C. in a manner that the gasification temperature is maintained by using the heat obtained through partial combustion of the fuel. This preheating procedure additively requires a burner, supply fuel, a supply pipe, and other facilities. In addition, the fuel needs to be combusted for a significantly long time since refractory materials of the gasifier need to be also sufficiently preheated. Therefore, an entrained-bed gasifier using coal or the like continuously operates for several months particularly after it is once preheated.

Meanwhile, the plasma gasifier generates plasma to form a flame by using external power, to thereby maintain the reaction temperature, and thus it is not necessary to maintain the temperature through combustion of the fuel. In addition, the plasma gasifier enables the temperature of the central part of the plasma to reach several thousands of degrees for a shot time as compared with the existing gasification manner, and thus has an advantage in that the time necessary for preheating is very shot. Further, gasification is carried out in the very high temperature condition, thereby obtaining a short retention time and a high fuel conversion ratio, and a sulfur compound or the like is decomposed by plasma, thereby collecting a clean synthetic gas.

In the existing gasification, the procedure of introducing the fuel into the gasifier has a great deal of influence on the process efficiency. The fuel is atomized and sprayed into the gasifier according to the fuel introduction manner, thereby improving the thermo-chemical conversion efficiency, controlling the retention time in the high-temperature gasification reactor, and facilitating the discharge of unburned ash in the fuel depending on the structure and shape of the gasifier, which are the same for plasma gasification. In the case of microwave plasma, the hydrocarbon fuel needs to be supplied after the plasma generation gas passes through a microwave region to form a plasma flame. Here, the temperature of the plasma is very high at the central part thereof but rapidly decreased toward the periphery thereof. Therefore, there is a technical problem in which the fuel needs to be appropriately supplied to the central part of the plasma. In the lab-scale experiment, a horizontal manner is often used for experimental convenience. In this horizontal structure, hydrocarbon fuel is supplied perpendicularly to flame after the plasma flaming, so that the fuel can be easily supplied to the high-temperature central region of the flame.

In the prior art, fossil fuels such as coal were used as fuel used in the plasma gasifier. However, due to the limitation of mining reserves, oil price fluctuation, and strengthening of $CO_2$ emission regulation, interests and studies on the utilization of new energy sources as an alternative for the fossil fuels are being increased. As for the bio-mass, which is $CO_2$-neutral energy, studies on primary utilization thereof by being combusted to obtain heat and electricity and high value-added utilization thereof by being converted into fuel for transfer, substitutable for petroleum, such as biodiesel, are actively being conducted.

The production amount of biodiesel all over the world has been growing by an average rate of 32.5% each year from 2000 to 2010. The production amount thereof up from 2006 to the present is increasing even more rapidly as compared with that of before 2000. In order to allow the US and the EU to attain their goal of substituting 20% and 30% of petroleum-based diesel with bio-diesel in 2020 and 2030, the production amount of biodiesel is expected to be continuously increased.

With respect to the current main method for producing bio-diesel, alcohol and a catalyst are added to vegetable oil (palm oil, abandoned edible oil, soybean oil, rape seed oil, or the like) and animal oil to allow an esterification reaction, thereby producing fatty acid methyl ester. Here, about 10 wt % of crude glycerin as a by-product is generated. The amount of waste glycerin generated is expected to be increased together with the generation of bio-diesel, and thus effective utilization of the waste glycerin is economically and environmentally important.

Currently, the waste glycerin is thermally used through simple combustion, or treated in a process for energy recovery and thus used in a different field. However, the waste glycerin reacts with steam at a high temperature to generate a synthetic gas containing hydrogen. This principle can lead to production of combustible gas, thermal utilization, production of hydrogen, generation of electricity, utilization as a raw material for various chemical materials, and finally diversification in bio-energy production.

The existing gasifying method not using plasma requires lots of time and energy for pre-heating a reactor. Due to this reason, when the apparatus is once operated, it needs to be continuously operated for several months. Therefore, waste glycerin was difficult to use due to the non-uniform productivity thereof. Whereas, the gasifying method using a plasma torch employs a high-temperature plasma flame and thus requires no time for preheating. Therefore, even though the production of waste glycerin is not uniform and balanceable, it is possible to operate and stop the apparatus anytime. Further, the synthetic gas produced can be rapidly supplied to a market needing combustible synthetic gas.

Accordingly, an apparatus for rapidly producing a combustible gas through a plasma reaction by using high-viscosity waste glycerin as fuel needs to be studied.

SUMMARY OF THE INVENTION

Accordingly, the present invention has been made to solve the above-mentioned problems occurring in the prior art, and an object of the present invention is to provide a an apparatus and a method for rapidly producing a synthetic gas from a bio-diesel byproduct using microwave plasma, in which, as fuel, waste glycerin, which is a bio-diesel product used as combustion fuel or in a different field due to a non-uniform production amount thereof, is gasified through plasma decomposition, thereby rapidly producing the synthetic gas.

Another object of the present invention is to provide an apparatus and a method for rapidly producing a synthetic gas from a bio-diesel byproduct using microwave plasma, in which, while high-viscosity waste glycerin is stably supplied to a plasma flame, the contact area and the contact time with the plasma flame are increased and the ratios of steam and oxygen mixed with the fuel are controlled, thereby reducing the generation amount of $CO_2$ and increasing the generation amount of combustible gas and thus improving the gasification efficiency.

In order to accomplish this object, there is provided an apparatus for rapidly producing a synthetic gas, the apparatus including: a gas supply chamber, which is a vertical pipe body for supplying a plasma generation gas; a plasma generator including a quartz pipe coupled with a lower end of the gas supply chamber on the same axis and compressing microwaves to a high density in the quartz pipe to thereby dissociate the plasma generation gas and form a plasma flame by plasma discharge; a fuel supply chamber coupled with the plasma generator to closely communicate with the quartz pipe on the same axis, a fuel being supplied to the plasma flame from a side surface of the fuel supply chamber by a fuel supply unit; a gasifying chamber coupled with a lower end of the fuel supply chamber on the same axis to perform fuel gasification at a high temperature; and a cyclone installed at a lower end of the gasifying chamber to separate gas and solid components from each other, wherein the fuel supply unit for supplying the fuel to the fuel supply chamber includes: a fuel storage tank for storing fuel therein; a fuel transfer pipe for transferring the stored fuel; a pump installed on a line of the fuel transfer pipe to supply a fixed quantity of the fuel stored in the fuel storage tank; a pre-heating bath for heating the fuel supplied through the fuel transfer pipe to pre-heat the fuel for facilitating thermal decomposition of the fuel; and a fuel introduction pipe for supplying the pre-heated fuel to the plasma flame formed inside the fuel supply chamber through the fuel supply port.

In accordance with another aspect of the present invention, there is provided a method for rapidly producing a synthetic gas by using an apparatus for rapidly producing a synthetic gas, in which a gas supply chamber for supplying a plasma generation gas, a quartz pipe of a plasma generator, a fuel supply chamber for supplying fuel to a plasma flame, and a gasifying chamber for performing high-temperature gasification are horizontally laid, the fuel supply chamber including a fuel supply unit installed thereat, the fuel supply unit having a fuel storage tank, a fuel transfer pipe for transferring the stored fuel therethrough, a pre-heating bath for heating the transferred fuel, and a fuel introduction pipe for supplying the pre-heated fuel into the fuel supply chamber therethrough, the method including: supplying the plasma generation gas into the gas supply chamber; supplying microwaves generated in the plasma generator to the supplied plasma generation gas; dissociating molecules of the plasma generation gas by an electric field of the supplied microwaves and forming a plasma flame by plasma discharge; performing atomization, dispersion, and supply of the waste glycerin by heating the waste glycerin to increase flowability of the waste glycerin and pre-heat the waste glycerin and atomizing, dispersing, and supplying the waste glycerin to the plasma flame using a transfer gas; thermally decomposing the waste glycerin, which is the fuel supplied to the plasma flame, by high-temperature heat of the plasma flame, to thereby produce a synthetic gas; and separating ash and char contained in the synthetic gas.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described in detail with reference to the accompanying drawings. However, the accompanying drawings are given merely for illustrating contents and ranges of technical spirits of the present invention and are not intended to limit or change the technical scope of the present invention. Further, it will be apparent to those skilled in the art that various changes and modifications may be made based on this within the technical scope of the present invention.

Figure 1:
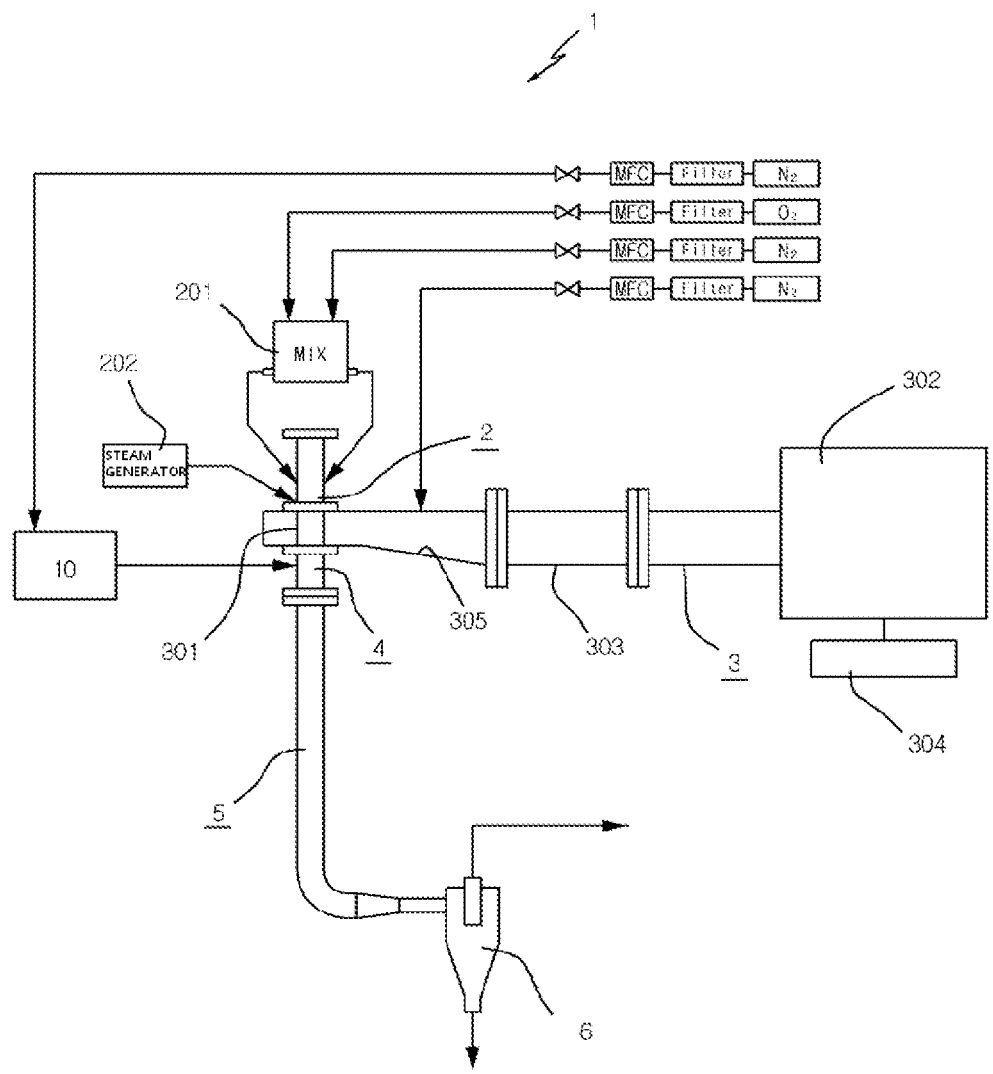
FIG. 1 is an overall schematic view showing an apparatus for rapidly producing a synthetic gas according to an embodiment of the present invention.

Hereinafter, the present invention will be described in detail with reference to the accompanying drawings. However, the accompanying drawings are m FIG. 1 is a constitutional view schematically showing an apparatus for rapidly producing a synthetic gas according to an embodiment of the present invention. As for an apparatus 1 for rapidly producing a synthetic gas according to the present invention shown in FIG. 1, a gas supply chamber 2 having a pipe body shape, a quartz pipe 301 of a plasma generator 3, a fuel supply chamber 4, and a gasifying chamber 5 are joined to each other on the same axis. A cyclone 6 is coupled with an end portion of the gasifying chamber to separate and remove solid components contained in the synthetic gas.

The gas supply chamber 2 is configured to supply a plasma generation gas. The plasma generation gas includes nitrogen, oxygen, and steam. A filter for removing foreign materials in the gas, a mass flow controller for controlling the supply amount of gas, and a valve may be installed on each gas supply line. Here, the valve is configured to open or close the gas supply line. As for the plasma generation gas, only one kind of gas may be supplied or plural kinds of gases may be mixed and supplied. As shown in FIG. 1, oxygen and nitrogen may be first mixed and supplied by a mixer 201 and then the steam generated by a steam generator 202 may be supplied. Alternatively, only nitrogen and steam may be supplied without supplying oxygen.

The plasma generator 3 includes a microwave source 302 for generating microwaves and a waveguide 303 linked to the microwave source 302.

An example of the microwave source 32 is a magnetron, which receives power to generate microwaves. In addition, a plasma controller 304 is installed at one side of the microwave source 302 to control the generation output of the microwaves (power of the plasma generator).

In addition, the microwaves generated from the microwave source 302 move to one side of the waveguide 303 through the waveguide 303. The waveguide 303 is horizontally laid to horizontally move the generated microwaves, and one side surface of the waveguide 303 has a taper portion 305 to thereby compress the microwaves to a high density, thereby maximizing the output electric field.

The quartz pipe 301 is vertically installed at an end portion of the horizontally laid waveguide 303, at which the generated microwaves are compressed to a high density. The gas supply chamber 2 is installed to communicate with an upper end of the quartz pipe 301 and the fuel supply chamber 4 is installed to communicate with a lower end of the quartz pipe 301 on the same axis. The reason why the quartz pipe 301 not made of a metal material, unlike the gas supply chamber 2 or the fuel supply chamber 4, is placed inside the waveguide 303 is that the pipe body penetrating the waveguide 303 is prevented from being heated and melted by the high-density microwaves.

In addition, the nitrogen supply line communicates with the waveguide 303 to allow an inside of the waveguide 303 to have a high pressure, which is equal to or similar to the pressure of the gas supply chamber 2, so that the plasma generation gas supplied to the gas supply chamber 2 can be prevented from flowing into the waveguide 303 through a gap between the placed quartz pipe 301 and the waveguide 303.

The plasma generation gas passing through the quartz pipe 301 becomes in a dissociation state in which gas molecules are disconnected by the electric field applied by the waveguide 303. A plasma flame is formed by plasma discharge, and the plasma flame is lengthened to an inside the fuel supply chamber 4 by a high-rate fluid flow.

The fuel supply chamber 4, which is a pipe body installed to communicate with a lower portion of the quartz pipe 301, supplies a fixed quantity of fuel to the plasma flame formed therein to allow thermal decomposition thereof. The supplied fuel is a material convertible into a combustible gas including hydrocarbon, and representative examples thereof may be coal, biomass, petroleum coke, waste plastic, organic wastes, and the like.

Particularly, the present invention employs, as fuel, waste glycerin or palm oil, which is a bio-diesel byproduct that is mainly used as combustible fuel due to high viscosity thereof. The present invention further includes a fuel supply unit 10 for stably supplying it to the fuel supply chamber 4, which will be later described in detail.

The gasifying chamber 5 is a pipe body where the fuel supplied from the fuel supply chamber 4 is thermally decomposed. That is, the fuel introduced to the plasma flame from the fuel supply chamber 4 is in contact with the plasma flame to be mostly thermally decomposed. A small amount of residual material that is not thermally decomposed is additionally subjected to thermal decomposition due to a high temperature, while moving along the gasifying chamber 5.

With respect to an internal flow passage including the gas supply chamber 2, the fuel supply chamber 4, and the gasifying chamber 5, the pressure thereof is controlled by the mass flow controller to allow the generated gas to be introduced to the cyclone 6 through a lower portion of the gasifying chamber 5.

The cyclone 6 separates a gas component and a solid component from each other, the solid component including ash and un-reacted char, and the synthetic gas, which is a gas component from which ash and un-reacted char are separated, is collected into a collecting tank or supplied to a place for use.

Here, the gas component separated by the cyclone 6 is analyzed by a component analyzer, so that analysis values therefrom may be used to control the supply amount of plasma generation gas, the supply amount of fuel, or the power of the plasma generator (the generation output of microwave). This control may be performed by a separate controller, and the plasma controller may be constituted as a part of the controller.

In this constitution, the fuel supply unit 10 for supplying the fuel to the fuel supply chamber 4 includes: a fuel storage tank 20 for storing fuel therein; a fuel transfer pipe 30 for transferring the stored fuel; a pump 40 installed on a line of the fuel transfer pipe 30 to supply a fixed quantity of the fuel stored in the fuel storage tank 20; a pre-heating bath 50 for heating the fuel supplied through the fuel transfer pipe 30 to pre-heat the fuel for facilitating thermal decomposition of the fuel; and a fuel introduction pipe 60 for supplying the preheated fuel to the plasma flame formed inside the fuel supply chamber 4.

Figure 2:
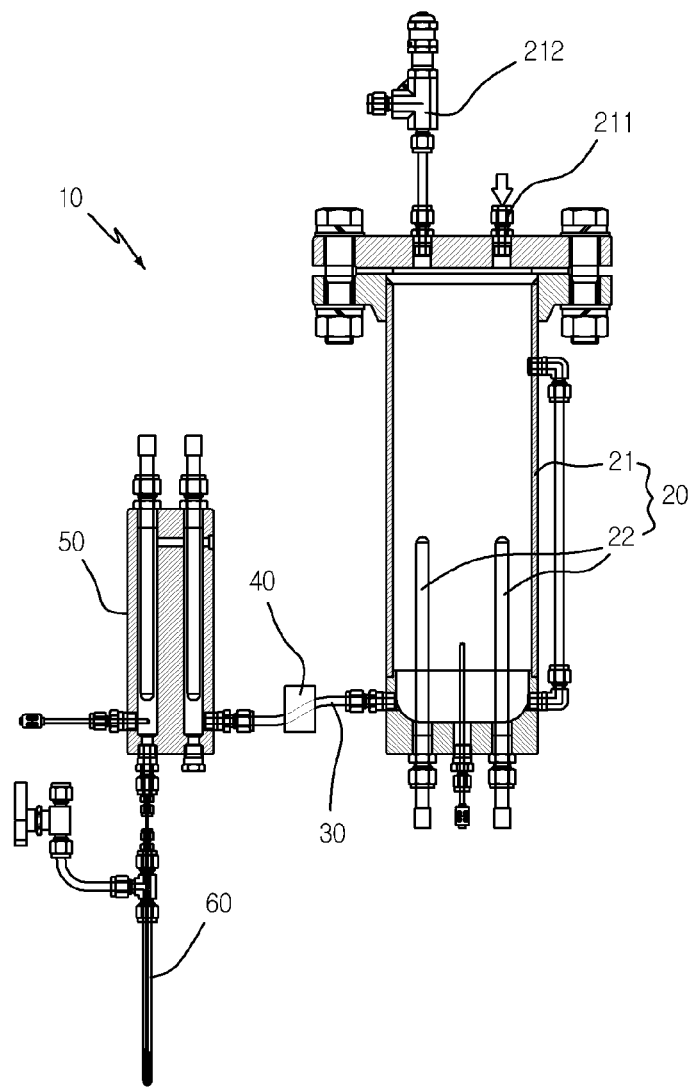
FIG. 2 is a constitutional view showing a fuel supply unit according to the present invention.

Referring to FIG. 2, the fuel storage tank 20 includes a storage tank main body 21, which is a can body for storing fuel therein and having a hollow part. The fuel transfer pipe 30 is installed to communicate with a side surface of a lower portion of the hollow part of the storage tank main body 21 to discharge the stored fuel (waste glycerin). In addition, a gas supply port 211 and a relief valve 212 may be installed at an upper portion of the hollow part to maintain the inside pressure of the hollow part, the upper portion of the hollow part being closed. The gas (nitrogen) is continuously introduced through the gas supply port, 211 and if the pressure of the hollow part is equal to or higher than a predetermined pressure, the gas filing an inside of the hollow part is partially discharged through the relief value 212, thereby uniformly maintaining the pressure of the hollow part at all times.

In addition, the storage tank main body 21 has one or plural storage tank heating poles 22. The storage tank heating pole 22 is installed to extend into the hollow part through a lower surface of the storage tank main body 21, and receives a heat source or an electric power from the outside to generate heat, which heats the stored fuel (waste glycerin). That is, since the waste glycerin used as fuel in the present invention has high viscosity and thus decreased flowability, the waste glycerin is heated to increase the flowability thereof, thereby facilitating the transfer thereof through the fuel transfer pipe 30.

In addition, the storage tank main body 21 may further have a fuel supply port introducing fuel therethrough. The storage tank main body 21 may further have a circulation pipe upwardly pumping the fuel with increased flowability below, thereby performing upward and downward circulation of the stored fuel.

The fuel transfer pipe 30 is a pipe body through which the fuel stored in the fuel storage tank 20 is transferred to the pre-heating bath 50. The pump 40 is installed at a line of the fuel transfer pipe 30 to pump the fuel. In the case where the fuel transfer pipe 30 is lengthened, a heat supply unit may be installed on an outer surface of the fuel transfer pipe 30 to prevent a decrease in flowability of the fuel transferred in the fuel transfer pipe 30, thereby preventing coagulation of the fuel and improving the flowability of the fuel. In addition, various kinds of pumps may be used, but it is preferable to use a fixed quantity pump for supplying a constant quantity or pressure of fuel.

The pre-heating bath 50 is configured to pre-heat the transferred fuel (waste glycerin) to a temperature at which thermal composition is facilitated, by adding heat thereto, thereby further increasing the flowability of the fuel and improving the efficiency for thermal decomposition at the time of contact with the plasma flame.

Figure 3A:
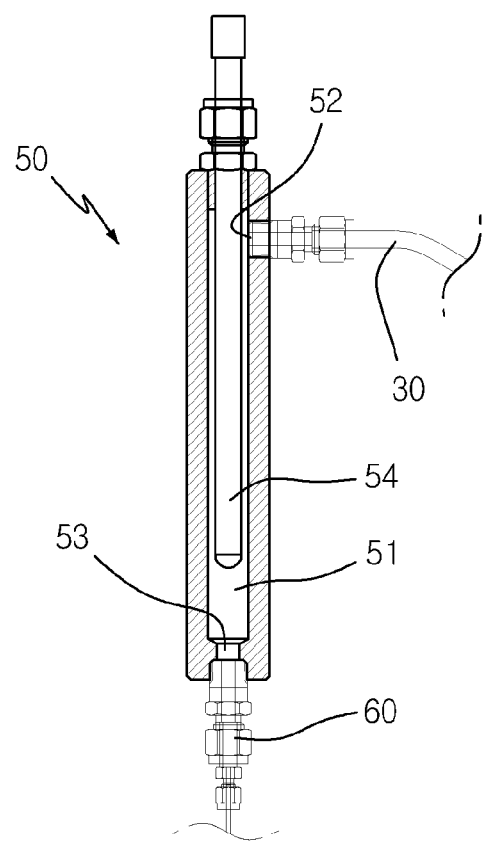
FIGS. 3A and 3B are cross-sectional views showing pre-heating baths respectively having one and two pre-heating flow passages in the fuel supply unit according to the present invention.

Referring to FIG. 3A, a pre-heating flow passage 51 is vertically formed within the pre-heating bath 50. An inlet 52 is formed at a side surface of an upper portion of the pre-heating flow passage 51, which is one end portion of the pre-heating flow passage 51, so that the pre-heating flow passage 51 can receive the fuel from the fuel transfer pipe 30 communicating with the inlet 52. An outlet 53 is formed at a lower side of a lower portion of the pre-heating flow passage 51, which is the other end portion of the pre-heating flow passage 51, so that the pre-heating flow passage 51 can discharge the fuel through the fuel introduction pipe 60. In addition, a heating pole 54 is installed inside the pre-heating flow passage 51 so that the fuel introduced through the inlet 52 can be pre-heated while passing through the pre-heating flow passage 51, and then discharged. The heating pole 54 is inserted into the pre-heating flow passage from an upper portion of the pre-heating bath. In the pre-heating flow passage 51 in which the heating pole 54 is installed, an inner wall of the pre-heating flow passage 51 and an outer surface of the pre-heating pole 54 are spaced apart from each other at a predetermined gap, to allow the fuel to be transferred through the spaced gap.

Figure 3B:
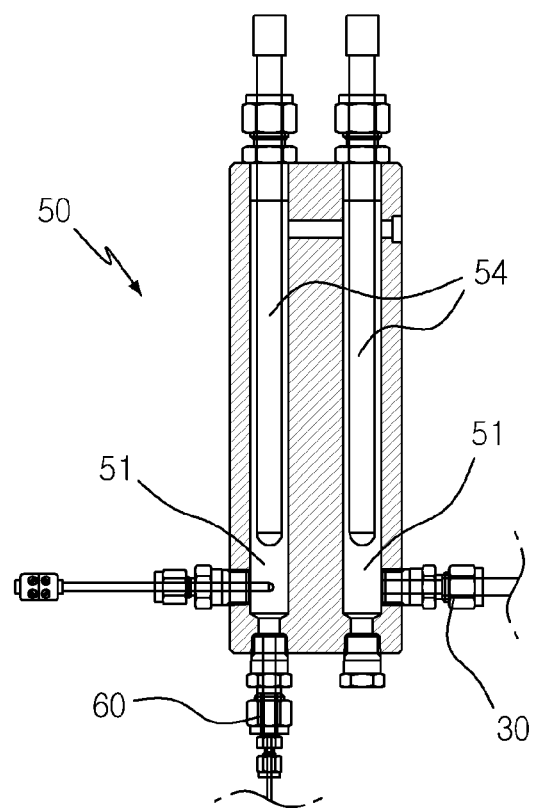

Referring to FIG. 3B, two pre-heating flow passages 51 may be formed inside the pre-heating bath 50. The two pre-heating flow passages 51 are connected by allowing one end portions thereof to communicate with each other (see, an upper part of FIG. 3B). The fuel transfer pipe 30 and the fuel introduction pipe 60 are connected to the other portions of the two pre-heating flow passages, respectively (see, a lower part of FIG. 3C). The two pre-heating flow passages 51 have pre-heating poles 54 therein, respectively, so that the fuel introduced through the fuel transfer pipe 30 is pre-heated while sequentially passing through the two pre-heating flow passages 51, and then discharged through the fuel introduction pipe 60.

As such, the pre-heating flow passage 51 is lengthened or two pre-heating flow passages 51 are formed, thereby increasing the pre-heating time, the time for which the fuel passages through the pre-heating flow passage 51, and thus improving the thermal decomposition rate by the pre-heating. In addition, a temperature sensor may be mounted on the outlet of the pre-heating flow passage 51 to measure the pre-heating temperature, so that the heating temperature of the pre-heating pole 54 can be decreased or increased by using the measured temperature.

The fuel introduction pipe 60 is coupled with the outlet 53 of the pre-heating flow passage 51 of the pre-heating bath 50 to supply the pre-heated fuel into the fuel supply chamber 4.

Figure 4:
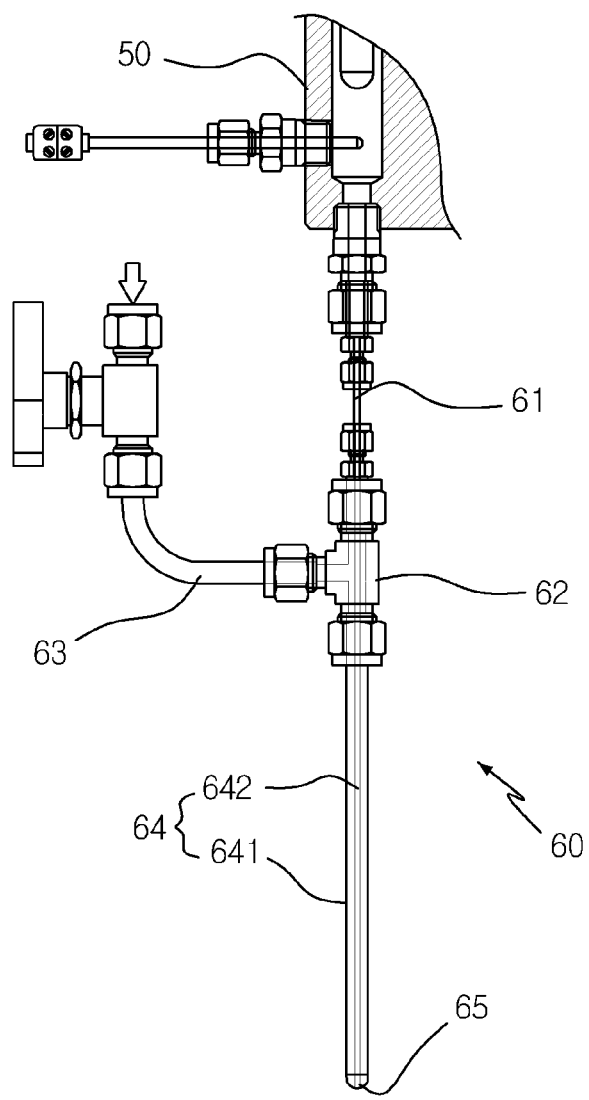
FIG. 4 is a schematic view showing a fuel introduction pipe according to the present invention.

As shown in FIG. 4, the fuel introduction pipe 60 includes a connection part 61 having one end coupled with the pre-heating bath 50. The connection part 61 may be constituted of one pipe body or plural connectors connected with each other as shown in FIG. 4. In this connection part, an inner flow passage thereof is gradually narrowed while passing the plural connectors, and finally the diameter thereof is the same as or similar to that of an inner pipe 641 of a double pipe 64.

Meanwhile, the fuel introduction pipe 60 has a T-tube 62. The T-tube 62 has a "T"-lettered shape. The connection part 61 and the double pipe 64 are connected to both ends of the T-tube 62 in a vertical direction thereof on the same axis and a transfer gas supply pipe 63 is coupled with a side surface of the T-tube 62. The transfer gas supply pipe 63 communicating with the side surface of the T-tube 62 is configured to supply a transfer gas to the double pipe 64 through the T-tube 62. A representative example of the transfer gas is nitrogen.

In addition, the double pipe 64 is placed on the same axis as the connection part 61 and communicates with the connection part 61 and the transfer gas supply pipe 63 by the T-tube 62. That is, the double pipe 64 consists of the inner pipe 641 and an outer pipe 642 while the inner pipe 641 communicates with the connection part 61 and the outer pipe 641 communicates with the transfer gas supply pipe 63. Thus, the fuel is transferred and discharged through the inner pipe 641 and the transfer gas is transferred and discharged through the outer pipe 642.

A nozzle tip 65 is further installed at one end of the double pipe 64 to thereby allow the fuel and the transfer gas to be atomized due to high-pressure discharge thereof, thereby increasing the contact area with the plasma flame and thus improving the efficiency for thermal decomposition.

Figure 5A:
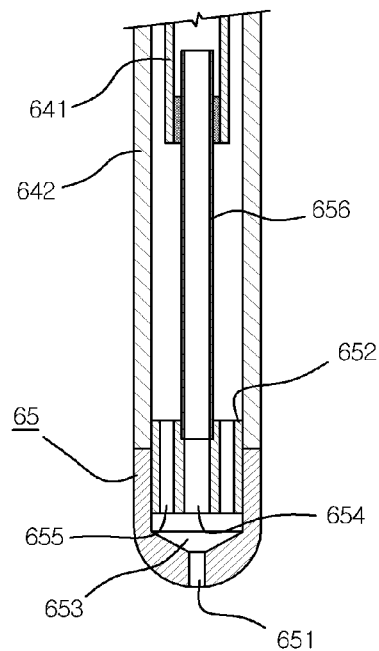
FIGS. 5A and 5B are main-portion cross-sectional views showing a nozzle tip of the fuel introduction pipe according to the present invention.

As shown in FIG. 5A, a discharge port 651 is formed in an end portion of the nozzle tip 65. A separator 652 is installed inside the nozzle tip 65 such that the separator 652 is spaced from the discharge port, to thereby form a mixing space 653 between the discharge port and the separator, and the nozzle tip 65 is coupled with an end portion of the double pipe, for example, the outer pipe 642. A central through-hole 654 is formed in the center of the separator 652, and plural outer through-holes 655 are formed along an outer circumference of the central through-hole 654. The central through-hole 654 communicates with the inner pipe 641 to allow the fuel to be discharged and the outer through-holes 655 communicate with the outer pipe 642 to allow the transfer gas to be discharged. The transfer gas and the fuel are first mixed in the mixing space 653 by a high-rate flow of the transfer gas, and then discharged through the discharge port 651 of the nozzle tip 65. The fuel is dispersed and atomized during the discharge procedure thereof and then supplied to the plasma flame.

In addition, the separator 652 of the nozzle tip 65 is installed such that the central through-hole 654 directly communicates with the inner pipe 641 of the double pipe 64, or the central through-hole 654 and the inner pipe 641 are connected to each other by using an extension pipe 656 having a smaller diameter than the inner pipe 641, so that the discharge pressure of the fuel can be increased.

Figure 5B:
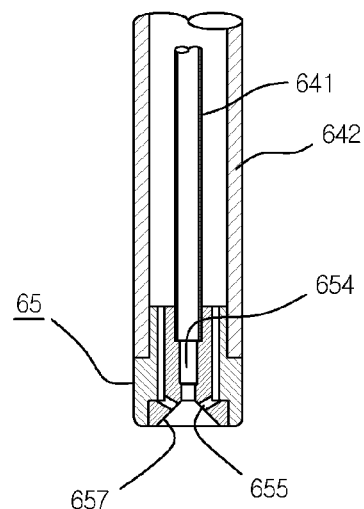

In addition, as shown in FIG. 5B, the nozzle tip 65 may be coupled with the outer pipe 642 of the double pipe 64 while the central through-hole 654 communicates with the inner pipe 641 in the center of the nozzle tip 65 and the plural outer through-holes 655 communicate with the outer pipe 642 along the outer circumference of the central through-hole 654.

Here, a spray groove 657 having a cone shape is formed in an end portion of the nozzle tip 65. The central through-hole 654 is formed in the center of the spray groove 657 and the plural outer through-holes 655 are formed in a slope inner surface of the spray groove 657 at an angle perpendicular to or close to the slope inner surface. Therefore, the fuel is discharged from the central through-hole 654 vertically downward in the drawing, and the transfer gas is sprayed at a high pressure from the slope surface of the spray groove 657 to a discharge direction of the fuel in the center part, so that the discharged fuel is atomized and diffused by the spray pressure of the transfer gas, and then supplied to the plasma flame, thereby increasing the contact surface with the plasma flame and thus improving the efficiency of thermal decomposition. Besides, the fuel is diffused in various types by controlling the discharge direction of the transfer gas, thereby improving the efficiency of thermal decomposition.

In addition, when the fuel is supplied to the fuel supply chamber 4 by using the fuel introduction pipe 60, it is preferable to introduce the fuel as closely as possible to a start portion of the plasma flame to thereby increase the contact time between the plasma flame and the fuel. Therefore, a portion of the fuel supply chamber 4, with which the fuel introduction pipe is coupled, is preferably formed at a side of an upper part as close as possible to the plasma generator. In addition, it is preferable that the supply direction of the fuel is horizontal or has a downward inclination at a predetermined angle (10~30°), thereby minimizing the resistance against a fluid flow direction inside the fuel supply chamber 4 and offering the reaction time as long as possible.

Figure 6:
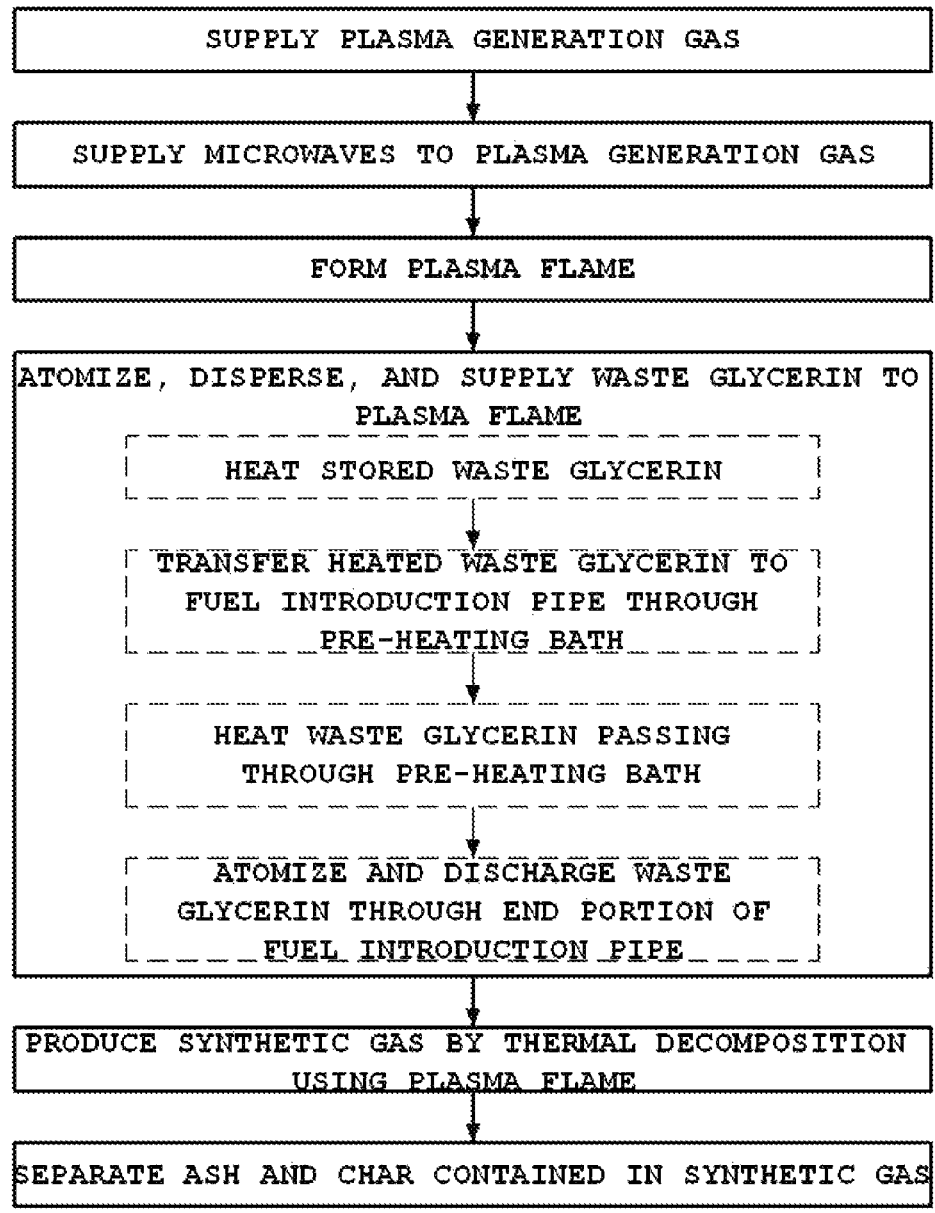
FIG. 6 is a flowchart illustrating a procedure for rapidly producing a synthetic gas according to the present invention.

Further, the method for rapidly producing a synthetic gas by using the apparatus for rapidly producing a synthetic gas according to the present invention as described above will be described with reference to FIG. 6. First, the plasma generation gas is supplied to the gas supply chamber 2. As for the plasma generation gas, nitrogen, oxygen, and steam are used. They may be mixed and supplied at one time, or as shown in FIG. 1, the steam may be supplied after nitrogen and oxygen are mixed and supplied.

Next, a microwave supply step is performed such that high-density microwaves are supplied to the plasma generation gas passing through the quartz pipe by using a plasma generator.

A plasma flame forming step is performed such that molecules of the plasma generation gas are dissociated by an electric field of the microwaves supplied with a high density and then a plasma flame is formed by plasma discharge in the quartz pipe.

The waste glycerin which has increased flowability and is pre-heated due to heating is supplied to the formed plasma flame while the waste glycerin is atomized, dispersed, and supplied by the transfer gas.

Here, the atomizing, dispersing, and supplying of the waste glycerin includes: heating the fuel such that heat is applied to the fuel storage tank to prevent coagulation of the stored waste glycerin and increase flowability thereof; transferring the fuel such that the heated waste glycerin is supplied to the fuel introduction pipe through the fuel transfer pipe and the pre-heating bath; pre-heating the fuel such that the waste glycerin passing through the pre-heating bath is heated to increase a temperature of the waste glycerin; and atomizing the waste glycerin such that the transfer gas is discharged at a high pressure while the waste glycerin is discharged through an end portion of the fuel introduction pipe, to thereby atomize the waste glycerin.

The waste glycerin, which is a fuel supplied to the plasma flame, is thermally decomposed by a high-temperature heat of the plasma flame, to thereby produce a synthetic gas, and then ash and char contained in the synthetic gas are separated therefrom, so that the synthetic gas can be rapidly collected.

In the above procedure, the supply ratio of oxygen/fuel (waste glycerin) is 0.0~0.8, and the supply ratio of steam/fuel (waste glycerin) is 0.4~1.0. The power of the plasma generator is set to be 1.2~1.6 kWe. If the ratio of oxygen supplied is increased, the content of the combustible gas is decreased. Therefore, the mixture ratio of oxygen/fuel is preferably 0~0.8.

Example

The rapid production of the synthetic gas from the bio-diesel byproduct (waste glycerin) by using microwaves according to the present invention was achieved by using the apparatus for rapidly producing a synthetic gas according to the present invention as shown in FIG. 1. As the plasma generation gas, nitrogen, oxygen, and steam were used. Element analysis, industrial analysis, and heating value analysis of the waste glycerin used, which is a bio-diesel byproduct, were tabulated in Table 1.

TABLE 1

| Industrial analysis (wt. %) | |
| --- | --- |
| Moisture | 15.41 |
| Volatile matter | 77.48 |
| Ash | 5.74 |
| Fixed carbon | 1.37 |
| Element analysis (wt. %) | |
| Carbon | 47.29 |
| Hydrogen | 10.03 |
| Nitrogen | 0.68 |
| Oxygen | 19.71 |

TABLE 1-continued

| | |
|---|---|
| Sulfur | 0.31 |
| Higher heating value (kcal/Nm) | 5,606~6643 (Five times of measurement) |

Figure 7:
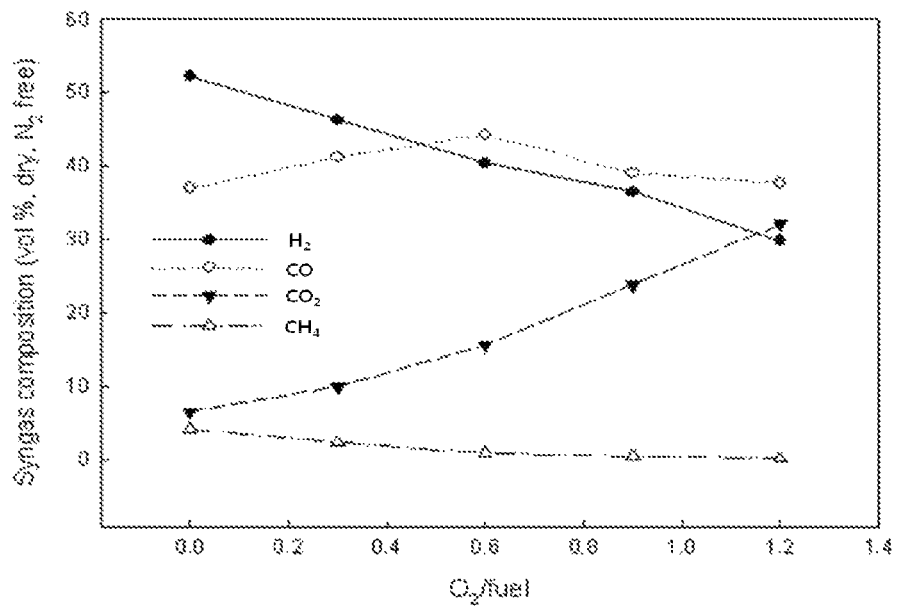
FIG. 7 is a graph showing a synthetic gas composition ratio depending on a change in the oxygen/fuel mixture ratio according to an embodiment of the present invention.

Under the conditions where the plasma power of the plasma generator was 1.6 kWe and the mixture ratio of steam/fuel was 0.4, the mixture ratio of oxygen/fuel was increased starting from 0 to 1.2 by steps. The composition ratio of the generated synthetic gas was measured and shown in FIG. 7.

It may be seen that, as the ratio of oxygen mixed was increased, the contents of hydrogen and methane in the generated gas were decreased and the content of oxygen was increased. When the mixture ratio of oxygen/fuel was 0.6, carbon monoxide exhibited the highest content. In the case of the plasma gasification technology in which heat necessary for a reaction can be supplied by an external power, the apparatus can be operated even without the supply of oxygen. Here, a generation gas having a high-content of hydrogen and little carbon dioxide can be collected. It may be seen that, since a lot of oxygen is supplied to combust the fuel, resulting in decreasing the collection amount of combustible gas, the optimum mixture ratio of oxygen/fuel is 0 to 0.8.

Figure 8:
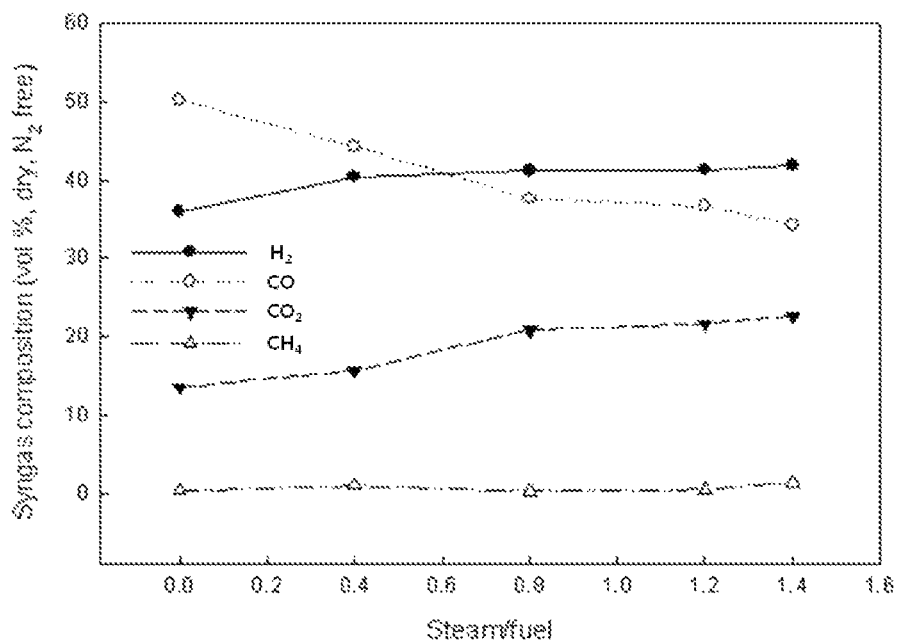
FIG. 8 is a graph showing a synthetic gas composition ratio depending on a change in the steam/fuel mixture ratio according to an embodiment of the present invention.

Then, under the conditions where the plasma power of the plasma generator is 1.6 kWe and the mixture ratio of oxygen/fuel is 0.6, the mixture ratio of steam/fuel was increased starting from 0 to 1.4 by steps. The composition ratio of the synthetic gas generated was measured and shown in FIG. 8.

It may be seen that, as the ratio of steam mixed was increased, the contents of hydrogen and carbon dioxide in the generated gas were increased and the content of carbon monoxide was decreased. Methane tended to be somewhat increased. Here, the supply of excessive steam functions to relatively lower the temperature in a high-temperature reactor, resulting in reducing the efficiency. Therefore, it may be seen that the optimum mixture ratio of steam/fuel is 0.4 to 1.0.

Figure 9:
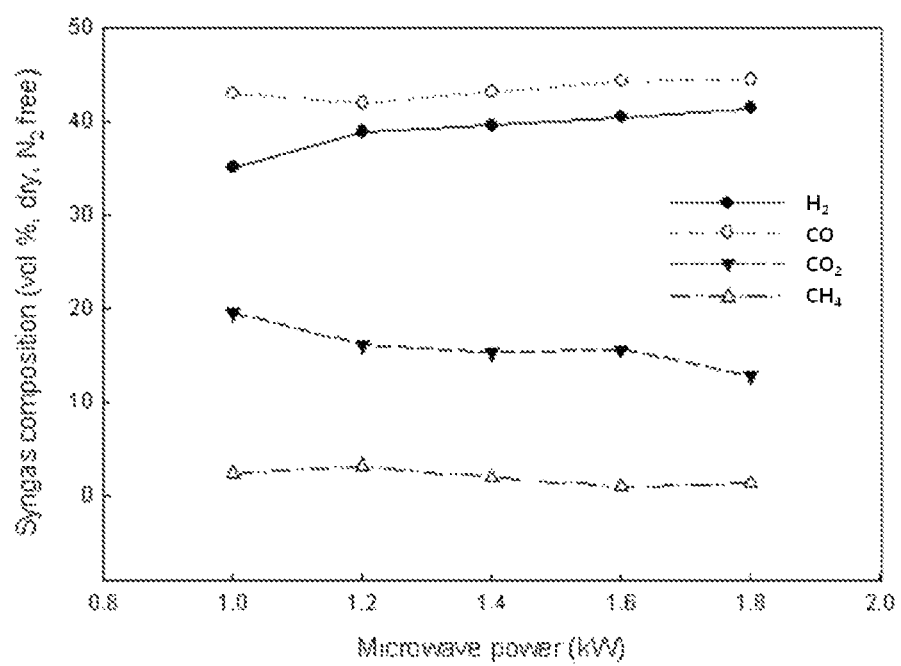
FIG. 9 is a graph showing a synthetic gas composition ratio depending on a change in plasma power according to an embodiment of the present invention.

Under the conditions where the mixture ratio of oxygen/fuel and steam/fuel are 0.6 and 0.4, respectively, the plasma power was increased from 1.0 to 1.8 by steps. The composition ratio of the synthetic gas generated was measured and shown in FIG. 9.

As the plasma power is increased, the contents of hydrogen and carbon monoxide tended to be increased and the contents of carbon dioxide and methane tended to be decreased. When the plasma power is increased, the plasma flame is lengthened and the contact time between the fuel and the high-temperature plasma flame was increased, with the result that more waste glycerin was converted into the combustible gas, thereby improving the gasifying efficiency.

As set forth above, according to the apparatus and the method for rapidly producing a synthetic gas from a bio-diesel byproduct using microwave plasma of the present invention, the synthetic gas can be rapidly produced by gasifying, as fuel, waste glycerin, which is a bio-diesel product used as combustion fuel or in a different field due to the non-uniform production amount thereof, through plasma decomposition.

Further, the contact time and the contact area of the waste glycerin with the plasma flame can be increased by atomizing, dispersing, and supplying the high-viscosity waste glycerin to a site as near as possible to a start portion of the plasma flame, and a decrease in the generation amount of $CO_2$ and an increase in the collection amount of $H_2$, which is a combustible gas, can be obtained by controlling the ratios of steam and oxygen mixed to the fuel and the plasma power.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for rapidly producing a synthetic gas, the apparatus comprising: a gas supply chamber, which is a vertical pipe body for supplying a plasma generation gas; a plasma generator including a quartz pipe coupled with a lower end of the gas supply chamber on the same axis and compressing microwaves to a high density in the quartz pipe to thereby dissociate the plasma generation gas and form a plasma flame by plasma discharge; a fuel supply chamber coupled with the plasma generator to couple with the quartz pipe on the same axis, wherein the fuel is waste glycerin, which is a bio-diesel byproduct, fuel being supplied to the plasma flame from a side surface of the fuel supply chamber by a fuel supply unit; a gasifying chamber coupled with a lower end of the fuel supply chamber on the same axis to perform fuel gasification at a high temperature; and a cyclone installed at a lower end of the gasifying chamber to separate gas and solid components from each other, wherein the fuel supply unit for supplying the fuel to the fuel supply chamber comprises:
a fuel storage tank for storing fuel therein;
a fuel transfer pipe for transferring the stored fuel;
a pump installed on a line of the fuel transfer pipe to supply a fixed quantity of the fuel stored in the fuel storage tank;
a pre-heating bath for heating the fuel supplied through the fuel transfer pipe to pre-heat the fuel for facilitating thermal decomposition of the fuel; wherein the pre-heating bath has a pre-heating flow passage therein, an inlet being formed in one end portion of the pre-heating flow passage to allow the pre-heating flow passage to communicate with the fuel transfer pipe and an outlet being formed in the other end portion thereof to allow the fuel to be discharged through the fuel introduction pipe, and wherein a heating pole being installed inside the pre-heating flow passage to allow the fuel introduced through the inlet to be pre-heated while passing through the flow passage and then discharged; and
a fuel introduction pipe for supplying the pre-heated fuel to the plasma flame formed inside the fuel supply chamber through the fuel supply port.

2. An apparatus for rapidly producing a synthetic gas, the apparatus comprising: a gas supply chamber, which is a vertical pipe body for supplying a plasma generation gas; a plasma generator including a quartz pipe coupled with a lower end of the gas supply chamber on the same axis and compressing microwaves to a high density in the quartz pipe to thereby dissociate the plasma generation gas and form a plasma flame by plasma discharge; a fuel supply chamber coupled with the plasma generator to couple with the quartz pipe on the same axis, wherein the fuel is waste glycerin, which is a bio-diesel byproduct, fuel being supplied to the plasma flame from a side surface of the fuel supply chamber by a fuel supply unit; a gasifying chamber coupled with a lower end of the fuel supply chamber on the same axis to perform fuel gasification at a high temperature; and a cyclone installed at a lower end of the gasifying chamber to separate gas and solid components from each other, wherein the fuel supply unit for supplying the fuel to the fuel supply chamber comprises:
a fuel storage tank for storing fuel therein;
a fuel transfer pipe for transferring the stored fuel;

a pump installed on a line of the fuel transfer pipe to supply a fixed quantity of the fuel stored in the fuel storage tank;

a pre-heating bath for heating the fuel supplied through the fuel transfer pipe to pre-heat the fuel for facilitating thermal decomposition of the fuel; wherein the pre-heating bath has two pre-heating flow passages therein, one end portions of the two pre-heating flow passages communicating with each other to connect the two-pre-heating flow passages to each other, the other portions of the two pre-heating flow passages being connected to the fuel transfer pipe and the fuel introduction pipe, respectively, and wherein heating poles are installed in the two pre-heating flow passages to allow the fuel introduced through the fuel transfer pipe to be pre-heated while sequentially passing through the two pre-heating flow passages and then discharged through the fuel introduction pipe; and a fuel introduction pipe for supplying the pre-heated fuel to the plasma flame formed inside the fuel supply chamber through the fuel supply port.

3. The apparatus of claim 1, wherein the fuel storage tank comprises a can body type storage tank main body having a hollow part for storing the fuel therein, the fuel transfer pipe being coupled with a lower portion of the hollow part; and a storage tank heating pole extended into the storage tank main body through a lower surface of the storage tank main body to heat the stored fuel.

4. The apparatus of claim 2, wherein the fuel introduction pipe includes a connection part having one end coupled with the pre-heating bath, a T-tube coupled with the other end of the connection part, a transfer gas supply pipe coupled with a side surface of the T-tube to supply a transfer gas, a double pipe coupled with the T-tube to be located on the same axis as the connection part and having an inner pipe and an outer pipe, and a nozzle tip installed on an end portion of the double pipe, and wherein the inner pipe of the double pipe communicates with the connection part to allow the fuel to be transferred, and the outer pipe of the double pipe communicates with the transfer gas supply pipe to allow the fuel to be transferred, so that the fuel is atomized, dispersed, and supplied through a discharge port of the nozzle tip.

5. The apparatus of claim 2, wherein the fuel storage tank comprises a can body type storage tank main body having a hollow part for storing the fuel therein, the fuel transfer pipe being coupled with a lower portion of the hollow part; and a storage tank heating pole extended into the storage tank main body through a lower surface of the storage tank main body to heat the stored fuel.

6. The apparatus of claim 1, wherein the fuel introduction pipe includes a connection part having one end coupled with the pre-heating bath, a T-tube coupled with the other end of the connection part, a transfer gas supply pipe coupled with a side surface of the T-tube to supply a transfer gas, a double pipe coupled with the T-tube to be located on the same axis as the connection part and having an inner pipe and an outer pipe, and a nozzle tip installed on an end portion of the double pipe, and wherein the inner pipe of the double pipe communicates with the connection part to allow the fuel to be transferred, and the outer pipe of the double pipe communicates with the transfer gas supply pipe to allow the fuel to be transferred, so that the fuel is atomized, dispersed, and supplied through a discharge port of the nozzle tip.

* * * * *